Jan. 2, 1940.     F. A. JIMERSON     2,185,812

SEALING DEVICE

Filed Jan. 6, 1939

INVENTOR
Francis A. Jimerson
BY
HIS ATTORNEY

Patented Jan. 2, 1940

2,185,812

UNITED STATES PATENT OFFICE 2,185,812

SEALING DEVICE

Francis A. Jimerson, Athens, Pa., assignor to Ingersoll-Rand Company, Jersey City, N. J., a corporation of New Jersey Application January 6, 1939, Serial No. 249,612

1 Claim. (Cl. 121—34)

The present invention relates to a sealing device for a multi-vane motor and more particularly it relates to a device for preventing leakage of the motor actuating fluid from the fluid conveying means which is supplying fluid to drive the motor.

Ordinarily, a multi-vane motor as employed with drills comprises a casing containing the multi-vane rotor which is placed in an appropriate housing. Actuating fluid for the rotor is conveyed thereto by an appropriate conduit in the housing communicating with a port in the casing to direct the fluid against the vanes of the rotor. In a reversible drill these ports and conduits are so arranged that fluid supplied by one port and conduit will drive the rotor in one direction while fluid supplied by the other port and conduit will drive the rotor in the opposite direction. In either arrangement it is important that no leakage occur between the respective conduits and ports since, obviously, any leakage would reduce the efficiency of the drill and, in all probability, render it inoperative. In ordinary practice, it is very difficult to provide a tight union at the junction of each conduit with its respective port and, at the same time, for a casing and rotor, which is easily removable for the purpose of examination and repairs.

Accordingly, it is an object of the present invention to provide a sealing means for the ports and conduits which permits removal and replacement of the rotor and its casing.

Another object is to provide a device wherein leakage of fluid under pressure from a conduit between the casing and housing of the drill is prevented.

A further object is to provide means whereby fluid cannot leak from a conduit supplying fluid to actuate the rotor in one direction to a conduit adapted to supply fluid to actuate the rotor in the opposite direction.

A still further object is to provide a simple, efficient and inexpensive seal which is readily adapted to prevent leakage in a drill.

Figure 1:
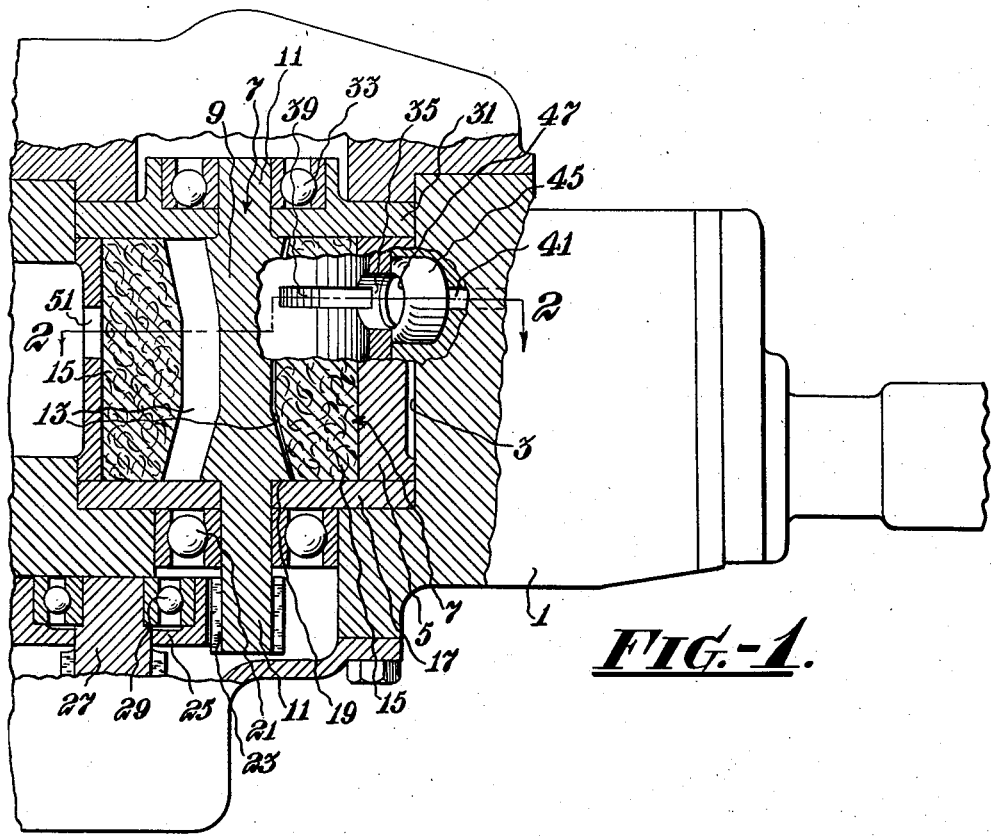
Figure 2:
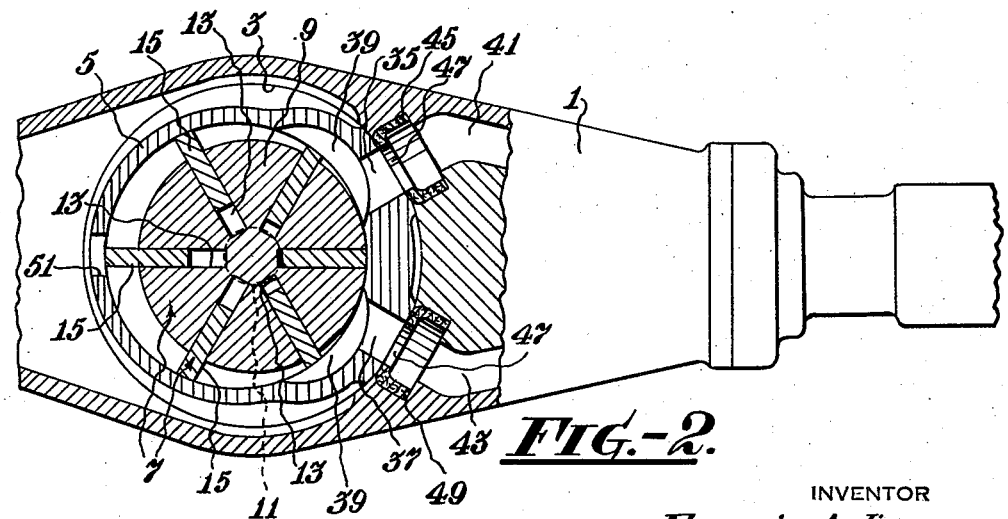

These and other objects will be apparent from the following specification and drawing in which:

Figure 1 is a view partly in section and partly in elevation of a portion of a multi-vane reversible drill and illustrates the application of the present invention thereto, Figure 2 is a view partly in section taken along line 2—2 of Fig. 1.

In Fig. 1 a portion of the drill housing 1 containing the motor is shown in which there is a recess 3 to receive the casing 5. The casing 5 in turn receives the rotor generally indicated at 7. The rotor 7 comprises a rotor proper 9, (Fig. 2), mounted on a shaft 11, provided with slots 13 in which are placed vanes 15 as will be seen from Fig. 2. The vanes 15 are moved out against the casing wall by centrifugal force during rotation of the rotor so that they will wipe the inner wall of the casing 5 and prevent any leakage therebetween. Of course air pressure or springs may be supplied to hold the vanes against the wall if deemed necessary. The rotor, being of smaller radius than the radius of the casing recess, is mounted eccentrically with respect to the casing 5 and is supported therein by a plate 17 on which shoulders 19 of the shaft are adapted to rest. The shaft 11 extends through this plate and is journalled in the roller bearing member 21. The extension of the shaft beyond the journal is provided with a gear 23 designed to mesh with a corresponding gear 25. The gear 25 is, in turn, mounted on the shaft 27 of the drill which is journalled in an appropriate bearing 29. It is thus apparent that upon rotation of the rotor 7 the rill shaft 27 will be rotated by means of the gears 23 and 25.

In order to further inclose the rotor in the cylindrical casing, a cover plate 31 rests on the upper walls of the casing 5 and has an appropriate passage through which the shaft 11 extends in order that it may be journalled in the bearing 33, positioned in a recess of the plate 31.

The casing 5 is provided with two inlet ports 35 and 37. The ports 35 and 37 are located at opposite sides of the casing and open into arcuate passages 39 formed by the casing walls which, in turn, communicate directly with the interior of the casing 5. Each of these ports 35 and 37 are also in communication with the conduits 41 and 43 which are provided in the housing 1. These conduits lead directly to the reversing valve which is not shown and are adapted to convey fluid under pressure to the respective ports to supply the fluid necessary to rotate the rotor.

The conduits 41 and 43 also serve as exhaust ports for the casing when they are not acting as a supply means. Thus when conduit 41 is supplying fluid under pressure to port 35, the port 37 and conduit 43 are acting as exhaust port and conduit for the fluid in the casing 5.

At the termination of the conduit 41, adjacent the port 35, the passage is counterbored or enlarged in order that the sealing member 45 may be placed therein. This sealing member 45 is made of a flexible material which is resistant to the action of oil, being preferable of rubber composition, and as shown is cylindrical in form. The walls of the cylinder are thin and terminate in an annular internal flange or lip at one end thereof. A similar gasket 49 is provided for the port 37 and conduit 43.

The gasket 45 serves the purpose of preventing any leakage of pressure fluid passing through conduit 41 and port 35 through the space between the casing 5 and the housing 1.

With this construction, it is possible to slip the members 45 and 49 into the enlarged portions of the conduits 41 and 43 so that the annular flanges contact the outer wall of the casing 5. Fluid under pressure supplied through conduits 41 and 43 will then tend to expand the cylindrical portions of the sealing members 45 radially against the walls of the enlarged passages of conduits 41 and 43 and the flanges or lips of the members will be pressed longitudinally against the wall of the casing 5. In this manner it is obvious that port 35 and conduit 41 as well as port 37 and conduit 43 are connected in a sealing engagement and any leakage between the housing 1 and the casing 5 is thus prevented. As is obvious, this gasket is easily removed and at the same time, admits easy removal of casing 5 and the rotor 7 when it is deemed expedient to remove these parts. Without this seal it would be necessary to join the parts securely, which would be very cumbersome and difficult. What has been said with regard to gasket 45 applies equally well to gasket 49.

It is very important that this sealing means be provided since it is apparent from the drawing that, in order to rotate the rotor in a counter-clockwise direction, fluid under pressure must be admitted through conduit 41 and port 35 in order that it may impinge on vanes 15.

As the rotor 9 is rotated the space formed between the rotor 9, vanes 15 and the walls of the casing gradually increase due to the eccentric mounting of the rotor in the casing. Expansion of this space continues until a vane uncovers the exhaust port 51 whereupon the fluid is permitted to escape through this port. The fluid is not permitted to escape, however, until its motive force has been utilized.

So long as the fluid under pressure is entering port 35, the port 37 cannot admit any fluid under pressure. If for any reason, this port should admit the fluid under pressure, it is readily seen that the pressure fluid admitted from this port would act on the vanes in the opposite direction from the fluid admitted from port 35. As a consequence, the rotor would remain at a stand still. This is one of the reasons why the sealing means is so important since it makes it impossible for fluid being supplied through conduit 41 to escape between the casing 5 and the housing 1 to the port 37 and enter the casing through this port. If such leakage were possible, the rotor would soon be brought to a stand still. The same is true when conduit 43 and port 37 are supplying the fluid pressure.

However, since these sealing means are provided, the pressure fluid is introduced by either conduit 41 or conduit 43 to the rotor and, after having expended its force on the rotor, escapes through the port 51. The port 47 and the conduit 43, of course, are utilized when it is desired to reverse the direction of rotation of the rotor and to revolve it in a clockwise direction.

While the invention has been described with particular reference to a multi-vane reversible motor for the sake of convenience the invention is equally adaptable to a non-reversible motor and to many other types of motors and devices and, accordingly, the scope of the invention is not to be limited save as defined in the appended claim.

I claim:

In a multi-vane motor for a drill and the like, a housing, a casing in the housing, a rotor in the casing, an inlet port in the casing to admit fluid under pressure to actuate the rotor, a conduit to supply fluid under pressure to the inlet port having an enlarged passage adjacent the inlet port, and a flexible member formed with a thin walled cylinder terminating at one end in an annular internal flange adapted to rest in the enlarged passage and to bear against the passage walls and the wall of the casing when fluid under pressure is supplied to the rotor and thereby effect a seal between the inlet port and conduit, and an exhaust port for the casing.

FRANCIS A. JIMERSON.